United States Patent
Kawabe

(10) Patent No.: US 10,493,585 B2
(45) Date of Patent: Dec. 3, 2019

(54) MACHINING SYSTEM INCLUDING ROBOT FOR TRANSPORTING MACHINED ARTICLE AND METHOD

(71) Applicant: FANUC CORPORATION, Yamanashi (JP)

(72) Inventor: Saneyuki Kawabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/874,148

(22) Filed: Jan. 18, 2018

(65) Prior Publication Data

US 2018/0207762 A1    Jul. 26, 2018

(30) Foreign Application Priority Data

Jan. 26, 2017   (JP) .................................. 2017-012195

(51) Int. Cl.
| | | |
|---|---|---|
| *B23Q 7/04* | (2006.01) | |
| *B23Q 39/04* | (2006.01) | |
| *B08B 3/04* | (2006.01) | |
| *B23Q 11/00* | (2006.01) | |

(52) U.S. Cl.
CPC ............ *B23Q 39/046* (2013.01); *B08B 3/041* (2013.01); *B23Q 7/04* (2013.01); *B23Q 7/047* (2013.01); *B23Q 11/0053* (2013.01); *B23Q 11/0075* (2013.01); *B23Q 11/0057* (2013.01)

(58) Field of Classification Search
CPC ...... B23Q 7/04; B23Q 7/047; B23Q 11/0042; B23Q 11/005; B23Q 11/0053; B23Q 11/0057; B23Q 11/0075; B23Q 11/1069; B23Q 39/046; B08B 3/041
See application file for complete search history.

(56) References Cited

U.S. PATENT DOCUMENTS

| | | | | |
|---|---|---|---|---|
| 4,416,577 A | * | 11/1983 | Inaba ................... | B23Q 11/005 15/304 |
| 6,568,407 B1 | * | 5/2003 | Matsumiya ............... | B08B 3/02 134/201 |
| 2001/0003931 A1 | | 6/2001 | Suzuki et al. | |

(Continued)

FOREIGN PATENT DOCUMENTS

| | | |
|---|---|---|
| CN | 104057354 A | 9/2014 |
| CN | 105033739 A | 11/2015 |

(Continued)

OTHER PUBLICATIONS

Translation JP 60-228053 A, Nov. 1985.*

*Primary Examiner* — Edward T Tolan
(74) *Attorney, Agent, or Firm* — Hauptman Ham, LLP

(57) ABSTRACT

A machining system includes: a working machine that machines an article while supplying a dielectric working fluid to the article; a robot that transports the machined article from the working machine; a controller that controls the robot; and a recessed wall part that is provided outside the working machine so as to demarcate the transport path of the article. The robot includes a gripping part that grips the article and a rotating part that rotates the gripping part. The controller is configured to move the gripping part with the machined article along the transport path while rotating the gripping part in the recessed wall part by means of the rotating part.

7 Claims, 4 Drawing Sheets

(56) References Cited

U.S. PATENT DOCUMENTS

| | | | | |
|---|---|---|---|---|
| 2004/0011768 A1* | 1/2004 | Beaumont | ................ | B23H 1/02 |
| | | | | 219/69.17 |
| 2007/0060022 A1* | 3/2007 | Wirz | ....................... | B23F 23/04 |
| | | | | 451/5 |
| 2016/0146589 A1* | 5/2016 | Jonas | ................... | G01B 21/045 |
| | | | | 33/503 |

FOREIGN PATENT DOCUMENTS

| | | | | |
|---|---|---|---|---|
| CN | 104057354 B | 4/2016 | | |
| CN | 105729237 A | 7/2016 | | |
| JP | 60-228053 A | * 11/1985 | ............ | B23Q 11/005 |
| JP | H06-20712 B2 | 3/1994 | | |
| JP | H7-251346 A | 10/1995 | | |
| JP | 3088141 U | 6/2002 | | |
| JP | 2016-067997 A | 5/2016 | | |
| JP | 2017-52055 A | 3/2017 | | |

* cited by examiner

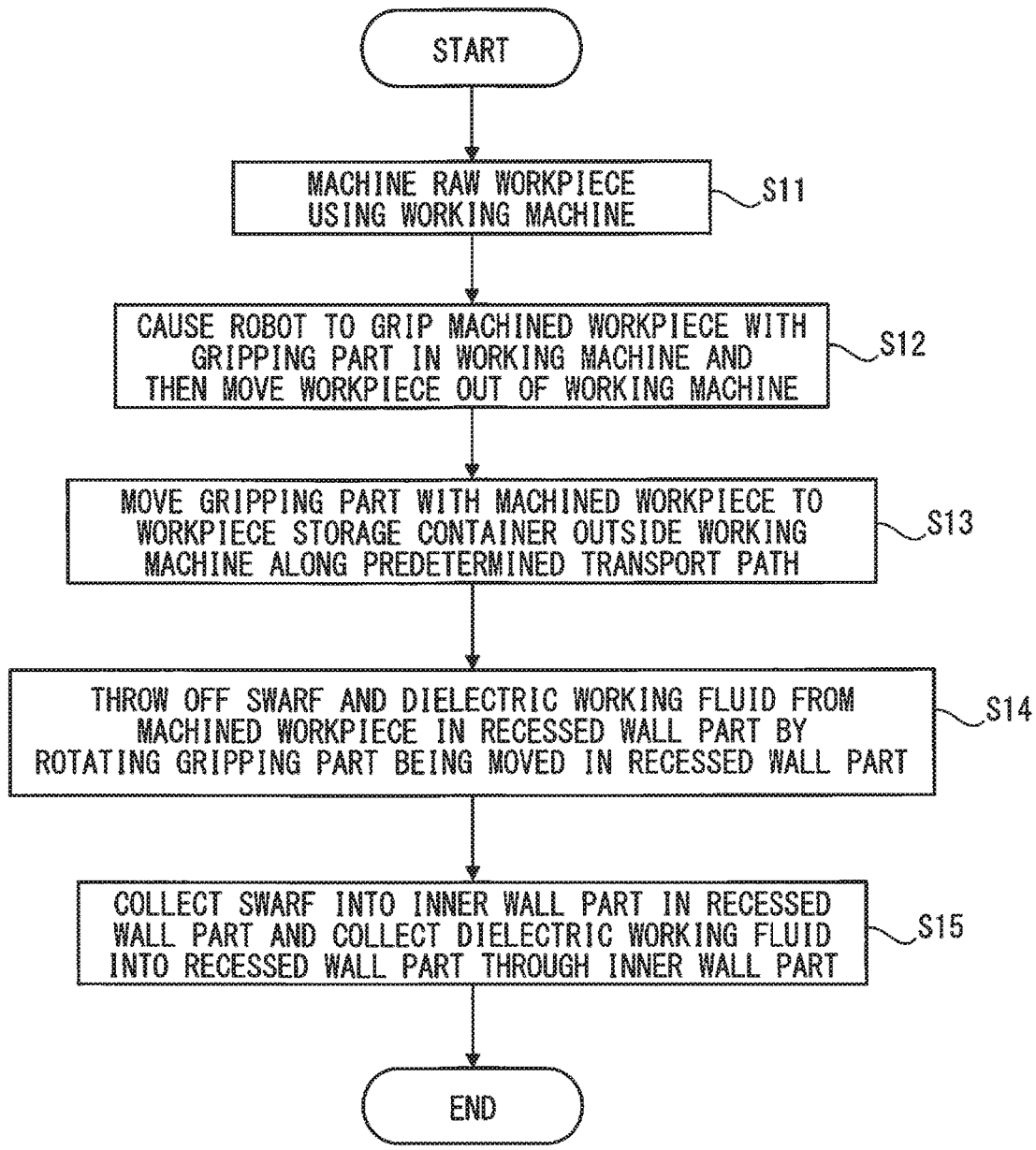

MACHINING SYSTEM INCLUDING ROBOT FOR TRANSPORTING MACHINED ARTICLE AND METHOD

RELATED APPLICATIONS

The present application claims priority to Japanese Patent Application No. 2017-012195 filed on Jan. 26, 2017, the disclosure of which is hereby incorporated by reference herein in its entirety.

BACKGROUND OF THE INVENTION

1. Field of the Invention

The present invention relates to a machining system including a robot for transporting a machined article, and an article transporting method.

2. Description of the Related Art

In working machines including a numerically controlled machine tool, a workpiece to be machined is cut or drilled while a dielectric working fluid is applied to the workpiece. Thus, the dielectric working fluid adheres to the machined workpiece. Swarf generated during the machining of the workpiece also adheres to the machined workpiece. The dielectric working fluid and swarf are desirably removed from the machined workpiece before the machined workpiece is transferred from a working machine to a subsequent machining apparatus.

In the related art, air is blown onto a machined workpiece in a working machine so as to remove the dielectric working fluid and swarf from the surface of the workpiece.

For example, in a known air-blowing chip remover, a remover body with an opening and an opening/closing door for transferring workpieces includes a conveyor for transporting workpieces and a nozzle device for blowing air (for example, refer to Japanese Utility Model Publication (U.M. Kokai) No. 3088141).

Moreover, in a known technique, chips on a workpiece, that is, swarf, are thrown off by centrifugal force generated by rotating the workpiece attached to the spindle of a lathe (for example, refer to Japanese Examined Patent Publication (Kokoku) No. 6-20712).

Furthermore, a known manufacturing line includes a working machine that cuts a workpiece while supplying a coolant to the workpiece, and a cleaning device that cleans the workpiece cut by the working machine (for example, refer to Japanese Unexamined Patent Publication (Kokai) No. 2016-67997).

SUMMARY OF THE INVENTION

In the techniques of Japanese Unexamined Utility Model Publication (U.M. Kokai) No. 3088141 and Japanese Examined Patent Publication (Kokoku) No. 6-20712, however, it is understood that swarf, such as chips, on a machined workpiece are removed in the body of the working machine. In this case, a large volume of swarf or cutting fluid is accumulated in the working machine. This increases the time for stopping an operation of the working machine and cleaning the inside of the working machine, thereby increasing the time from the completion of machining of a workpiece to a subsequent step (hereinafter will be referred to as cycle time).

Moreover, as in the technique described in Japanese Unexamined Patent Publication (Kokai) No. 2016-67997, the cycle time is increased if the machined workpiece is stopped in the cleaning device when being moved from the working machine to a transfer destination.

For labor saving and higher productivity in a production site, a robot is used to transport raw workpieces from a workpiece stocker to a working machine, e.g., a numerically controlled machine tool, or to transport machined workpieces from the working machine to the workpiece stocker.

In such a machining system where a robot is used to transport machined workpieces from a working machine to a workpiece stocker, it is desired to remove the dielectric working fluid and swarf from machined workpieces while preventing an increase in cycle time.

An aspect of the present disclosure is a machining system including: a working machine that machines an article while supplying a dielectric working fluid to the article; a robot that transports the machined article from the working machine; a controller that controls the robot; and a recessed wall part that is provided outside the working machine so as to demarcate the transport path of the article, the robot including a gripping part that grips the article and a rotating part that rotates the gripping part, the controller being configured to move the gripping part with the machined article along the transport path while rotating the gripping part in the recessed wall part by means of the rotating part.

Another aspect of the present invention is an article transporting method in which an article is machined in a working machine while a dielectric working fluid is supplied to the article, and the machined article is then transported from the working machine by a robot, wherein a recessed wall part is provided outside the working machine so as to demarcate the transport path of the article, and the article transporting method includes the step of throwing off the dielectric working fluid adhering to the machined article or the dielectric working fluid and swarf in the recessed wall part by causing the robot to move the machined article along the transport path while rotating the machined article in the recessed wall part.

BRIEF DESCRIPTION OF THE DRAWINGS

A description of the embodiment in accordance with the accompanying drawings will further clarify the object, characteristics, and advantages of the present invention. In the accompanying drawings:

FIG. 4 is a flowchart for describing an example of removal of a cutting fluid and swarf from a machined workpiece W in the machining system according to the embodiment.

DETAILED DESCRIPTION

Figure 1:
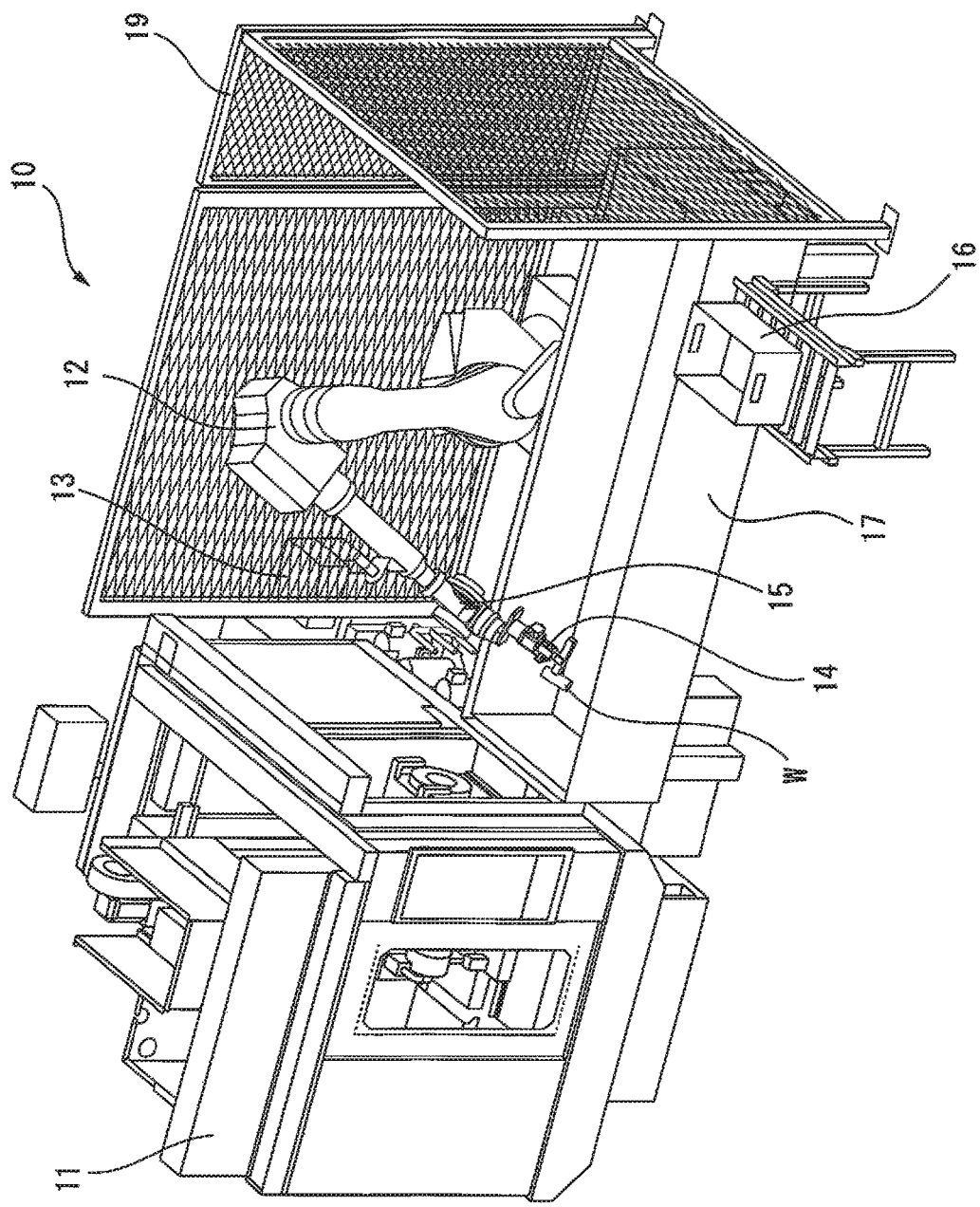
FIG. 1 is a perspective view showing the overall configuration of a machining system according to an embodiment.

An embodiment of the present invention will be described below with reference to the accompanying drawings. In all the drawings, the equivalent constituent elements are indicated by common reference symbols. To enhance understanding, the scales of the drawings are optionally changed. The configuration in the drawings is merely an example for implementing the present invention. The present invention is not limited to the illustrated configuration.

Figure 2:
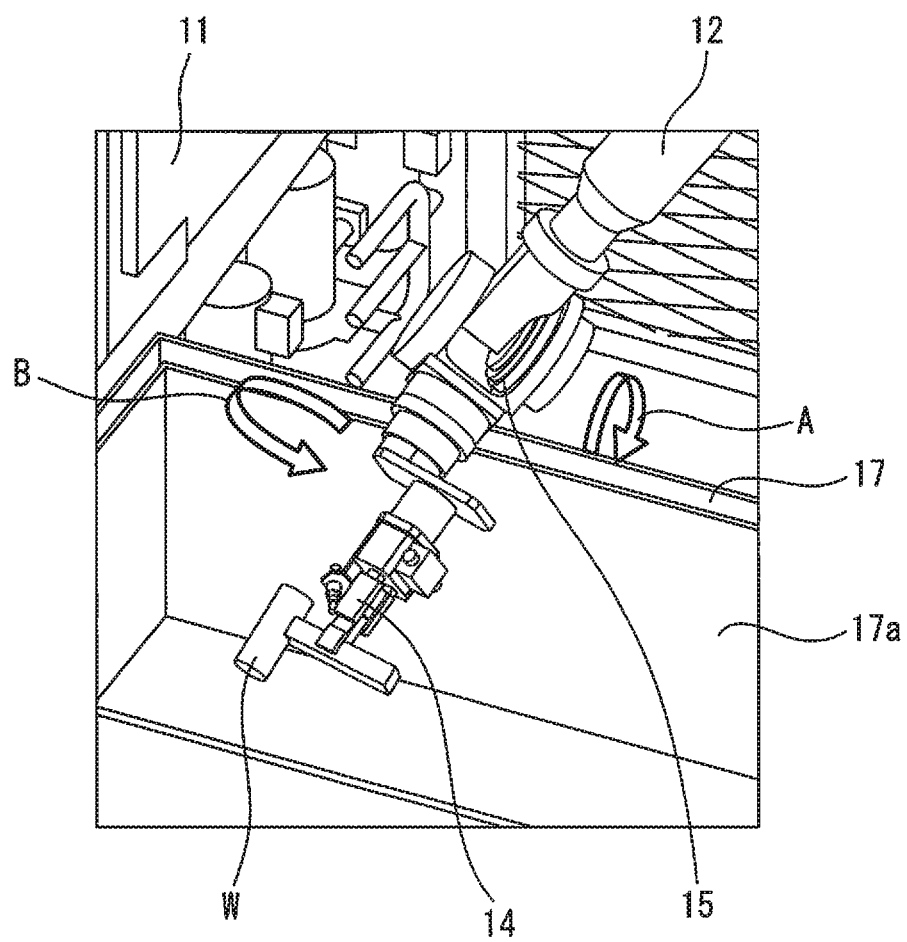
FIG. 2 is an enlarged view showing a gripping part and a rotating part in FIG. 1.

FIG. 1 is a perspective view showing the overall configuration of a machining system 10 according to the embodiment. FIG. 2 is an enlarged view of a gripping part 14 and a rotating part 15 that are shown in FIG. 1.

As shown in FIG. 1, the machining system 10 includes a working machine 11 that machines a workpiece W while supplying a dielectric working fluid to the workpiece W serving as an article, a robot 12 that transports the machined workpiece W from the working machine 11, a controller 13 that controls the robot 12, and a recessed wall part 17 that is provided outside the working machine 11 so as to demarcate the transport path of the workpiece W.

The working machine 11 is, for example, a numerically controlled machine tool or a numerically controlled lathe. The robot 12 is surrounded by a safety fence 19. The robot 12 is, for example, a vertical articulated robot, a horizontal articulated robot, or a three-axis orthogonal robot. The robot 12 can perform an operation for transporting a raw workpiece W from a workpiece stocker (not shown) to the working machine 11 in addition to an operation for transporting the machined workpiece W from the working machine 11 to a predetermined location, e.g., a workpiece storage container 16 outside the working machine 11.

The robot 12 includes the gripping part 14 that grips the workpiece W and the rotating part 15 that rotates the gripping part 14. If the robot 12 is a six-axis vertical articulated robot as shown in FIG. 1, the gripping part 14 is provided on the distal end of an arm part of the robot 12 and the rotating part 15 corresponds to a motor (not shown) for rotating a fifth axis (J5) and a sixth axis (J6) that are the joint axes of a wrist part connecting the distal end of the arm part and the gripping part 14. In this case, the gripping part 14 can rotate in two rotation directions indicated by arrow A and arrow B in FIG. 2. In the present invention, the rotation direction of the gripping part 14 is not limited to the directions of arrow A and arrow B. The rotating part 15 only requires a structure for rotating the gripping part 14 by means of a motor (not shown) around at least one of three orthogonal axes defined on a flange surface at the distal end of the arm part of the robot 12. Thus, the rotation of the gripping part according to the present invention includes a slewing motion and a reciprocating motion with respect to a rotary axis. The gripping part 14 may be rotated not only in one direction but also alternately clockwise and counterclockwise.

Furthermore, the recessed wall part 17 is installed outside the working machine 11. The recessed wall part 17 is provided so as to cover the right and left sides and the bottom of a predetermined path, that is, along a transport path when the robot 12 moves the machined workpiece W from the working machine 11 to the workpiece storage container 16. This configuration is merely exemplary and the recessed wall part 17 may have any shape as long as the recessed wall part 17 surrounds the moving workpiece W.

The transport path of the machined workpiece W is determined beforehand such that the gripping part 14 with the gripped workpiece W enters the recessed wall part 17 and moves to the workpiece storage container 16 along the recessed wall part 17. The transport path is stored beforehand in the memory in the controller 13 of the robot 12 according to a teaching operation.

The controller 13 of the present embodiment moves the gripping part 14 to the workpiece storage container 16 outside the working machine 11 along the transport path while the gripping part 14 with the gripped workpiece W is rotated by the rotating part 15 in the recessed wall part 17. This can throw off swarf and the dielectric working fluid that have adhered to the machined workpiece W in the recessed wall part 17.

Specifically, when the workpiece W is machined in the working machine 11, such as a numerically controlled machine tool, the workpiece W is machined by cutting or drilling while a dielectric working fluid, such as cutting oil, and coolant is applied to the workpiece W. Swarf generated from the workpiece W during machining adheres to the surface of the workpiece W along with the dielectric working fluid.

In order to throw off the swarf and the dielectric working fluid from the surface of the workpiece W, the controller 13 can control the rotating part 15 such that the gripping part 14 is rotated to apply a centrifugal force to the swarf and the dielectric working fluid on the workpiece W. Moreover, the rotating part 15 can be controlled such that a forward rotation and a backward rotation of the gripping part 14 are alternated to apply an inertial force to the swarf and the dielectric working fluid on the workpiece W.

Furthermore, in order to throw off the swarf and the dielectric working fluid that have adhered to a machined part of the workpiece W, the controller 13 can rotate the gripping part 14 while causing the gripping part 14 to grip a part as far as possible from the machined part of the workpiece W. The maximum rotation speed of the gripping part 14 may be determined within the range in which the workpiece W can be gripped, while the rotation speed of the gripping part that grips the workpiece W with the dielectric working fluid and swarf is empirically changed.

As shown in FIG. 2, the joint axes of the wrist part of the articulated robot and the motor for driving the joint axes are used as the rotating part 15, eliminating the need for additionally providing the robot 12 with a rotating device for throwing off the swarf and the dielectric working fluid from the surface of the workpiece W.

Figure 3:
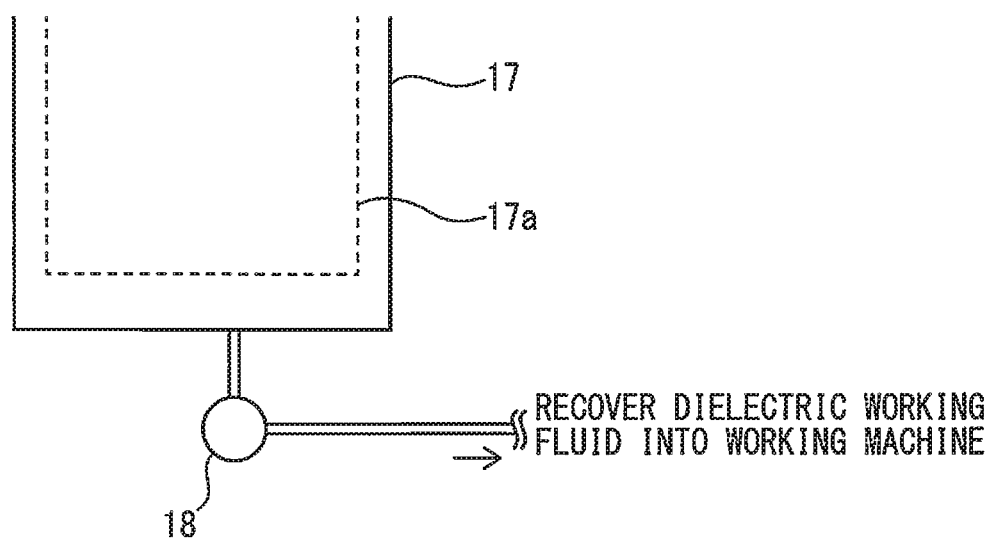
FIG. 3 is a schematic diagram showing a cross section of a recessed wall part in FIG. 1.

FIG. 3 is a schematic diagram of a cross section of the recessed wall part 17 shown in FIG. 1. As shown in FIG. 3, the recessed wall part 17 has an inner wall part 17a that allows only the passage of the dielectric working fluid without allowing the passage of swarf. The recessed wall part 17 is preferably configured to receive the dielectric working fluid having passed through the inner wall part 17a. The inner wall part 17a is, for example, a mesh plate member that is formed into a recessed shape. The inner wall part 17a may have a mesh size of, for example, 5 mm or less. Moreover, the recessed wall part 17 may be connected to a collection pump 18 for collecting the dielectric working fluid accumulated in the recessed wall part 17, into a dielectric working fluid tank (not shown) provided in the working machine 11. Furthermore, the recessed wall part 17 may have an air blower (not shown) that blows air onto the machined workpiece W when the workpiece W is moved by the robot 12.

FIG. 4 is a flowchart for describing an example of removal of a cutting fluid and swarf from the machined workpiece W in the machining system 10 according to the present embodiment. It is assumed that the raw workpiece W is transported into the working machine 11 before the operation flow of FIG. 4. Furthermore, it is assumed that the recessed wall part 17 including the inner wall part 17a is installed beforehand along the predetermined transport path where the gripping part 14 moves the workpiece W from the working machine 11 to the workpiece storage container 16.

First, in step S11 of FIG. 4, the working machine 11 machines the raw workpiece W. After the completion of machining, the controller 13 operates the robot 12 and the gripping part 14 according to a stored operation program. Thus, in step S12, the robot 12 grips the machined workpiece W by means of the gripping part 14 in the working machine 11 and then moves the workpiece W out of the working machine 11.

Subsequently, in step S13, the gripping part 14 having gripped the machined workpiece W moves to the workpiece storage container 16 outside the working machine 11 along the predetermined transport path. The recessed wall part 17 lies on the right and left sides and the bottom of the moving gripping part 14.

Subsequently, in step S14, the controller 13 causes the rotating part 15 to rotate the moving gripping part 14 in the recessed wall part 17. This throws off the swarf and the dielectric working fluid from the machined workpiece W in the recessed wall part 17. The gripping part 14 preferably keeps rotating in the recessed wall part 17 from entry into the recessed wall part 17 to a movement to the vicinity of the workpiece storage container 16.

Swarf and the dielectric working fluid that are thrown off from the workpiece W are received by the recessed wall part 17. Specifically, swarf is collected by the inner wall part 17a in the recessed wall part 17 and the dielectric working fluid is collected by the recessed wall part 17 through the inner wall part 17a (step S15).

The operation flow removes swarf and the dielectric working fluid from the machined workpiece W.

The machining system 10 mentioned above can obtain the following effects:

The machined workpiece W in the working machine 11 is gripped by the gripping part 14 of the robot 12 and is moved to the predetermined location outside the working machine 11; meanwhile, the machined workpiece W is rotated in the recessed wall part 17 so as to throw off the swarf and the dielectric working fluid that have adhered to the workpiece W in the recessed wall part 17.

In the present embodiment, without stopping the transfer of the machined workpiece W out of the working machine 11, swarf and the dielectric working fluid are removed from the machined workpiece W in a flow of transferring the machined workpiece W to the predetermined location outside the working machine 11. In other words, the present embodiment eliminates the need for providing a special time for removing the swarf and the dielectric working fluid from the machined workpiece W and the need for setting, inside and outside the working machine 11, a workpiece installation location for the removal.

With this configuration, in the machining system 10 where the workpiece W machined by the working machine 11 is transported out of the working machine 11 by the robot 12, a cutting fluid and swarf can be removed from the machined workpiece W without increasing cycle time.

It would be understood by a person skilled in the art that the foregoing embodiment of the present invention can be modified and changed in various ways without departing from the disclosed scope of claims, which will be discussed later.

In order to solve the problems of the present disclosure, various aspects and the effects thereof can be provided as will be discussed below. The numbers in parentheses in the description of the aspects are equivalent to reference symbols in the drawing of the present disclosure.

For example, a first aspect of the present disclosure may be a machining system (10) including: a working machine (11) that machines an article (W) while supplying a dielectric working fluid to the article; a robot (12) that transports the machined article (W) from the working machine (11); a controller (13) that controls the robot (12); and a recessed wall part (17) that is provided outside the working machine (11) so as to demarcate the transport path of the article (W), the robot (12) including a gripping part (14) that grips the article (W) and a rotating part (15) that rotates the gripping part (14), the controller (13) being configured to move the gripping part (14) with the machined article (W) along the transport path while rotating the gripping part (14) in the recessed wall part (17) by means of the rotating part (15).

According to the first aspect, cutting fluid and swarf can be removed from the machined workpiece while the workpiece machined by the working machine is transported out of the working machine by the robot. This can prevent an increase in cycle time.

A second aspect of the present disclosure, according to the machining system (10) of the first aspect, may be a machining system (10) in which the recessed wall part (17) has an inner wall part (17a) that allows only the passage of the dielectric working fluid, the recessed wall part (17) being configured to receive the dielectric working fluid having passed through the inner wall part (17a).

According to the second aspect, swarf and the dielectric working fluid that have adhered to the machined article can be separately collected.

A third aspect of the present disclosure, according to the machining system (10) of the first aspect or the second aspect, may be a machining system (10) in which the robot (12) is an articulated robot and the rotating part (15) is a motor for rotating the joint axes of the wrist part of the articulated robot.

According to the third aspect, in order to remove swarf and the dielectric working fluid from the machined article, the robot does not need to be additionally provided with a rotating part that rotates the gripping part. In other words, the joint axes of the wrist part of the articulated robot and the motor for driving the joint axes can be used as they are.

A fourth aspect of the present disclosure may be an article transporting method in which an article (W) is machined in a working machine (11) while a dielectric working fluid is supplied to the article (W), and then the machined article (W) is transported from the working machine (11) by a robot (12), wherein a recessed wall part (17) is provided outside the working machine (11) so as to demarcate the transport path of the article (W), and the article transporting method includes the step of throwing off the dielectric working fluid adhering to the machined article (W) or the dielectric working fluid and swarf in the recessed wall part (17) by causing the robot (12) to move the machined article (W) along the transport path while rotating the machined article (W) in the recessed wall part (17).

According to the fourth aspect, the same effect can be obtained as in the first aspect. In other words, a cutting fluid and swarf can be removed from the machined workpiece while the workpiece machined by the working machine is transported out of the working machine by the robot. This can reduce cycle time.

A fifth aspect of the present disclosure, according to the article transporting method of the fourth aspect, may be an article transporting method in which the recessed wall part (17) has an inner wall part (17a) that allows only the passage of the dielectric working fluid, the recessed wall part (17) being configured to receive the dielectric working fluid having passed through the inner wall part (17a).

According to the fifth aspect, as in the second aspect, the swarf and the dielectric working fluid that have adhered to the machined article can be separately collected.

The invention claimed is:

1. A machining system, comprising:
   a working machine configured to machine an article while supplying a dielectric working fluid to the article;
   a robot configured to transport the machined article from the working machine, the robot being installed outside the working machine;
   a controller configured to control the robot; and
   a recessed wall part that is provided outside the working machine so as to demarcate a transport path of the article,
   the robot including
      a gripping part configured to grip the article, and
      a rotating part configured to rotate the gripping part,
   the controller being configured to move the gripping part with the machined article along the transport path while rotating the gripping part in the recessed wall part by the rotating part, wherein the gripping part is rotated by the rotating part about a rotational axis that moves along the transport path.

2. The machining system according to claim 1, wherein the recessed wall part has an inner wall part configured to allow the dielectric working fluid, but not swarf, to pass through, the recessed wall part being configured to receive the dielectric working fluid having passed through the inner wall part.

3. The machining system according to claim 2, wherein the inner wall part is a mesh.

4. The machining system according to claim 1, wherein the robot is an articulated robot, and the rotating part is a motor for rotating joint axes of a wrist part of the articulated robot.

5. A method, comprising:
   machining an article in a working machine while a dielectric working fluid is supplied to the article; and then
   transporting the machined article from the working machine by a robot installed outside the working machine,
   wherein
   a recessed wall part is provided outside the working machine so as to demarcate a transport path of the article, and
   said transporting includes throwing off the dielectric working fluid, or the dielectric working fluid and swarf, adhering to the machined article in the recessed wall part by causing the robot to move the machined article along the transport path while rotating the machined article in the recessed wall part, wherein the machined article is rotated about a rotational axis that moves along the transport path during said rotating.

6. The method according to claim 5, wherein
   the recessed wall part has an inner wall part configured to allow the dielectric working fluid, but not swarf, to pass through, and
   during said transporting, the recessed wall part receives the dielectric working fluid having been thrown off the machined article and then passed through the inner wall part.

7. The method according to claim 6, wherein the inner wall part is a mesh.

* * * * *